(12) United States Patent
Chen

(10) Patent No.: US 12,073,417 B2
(45) Date of Patent: Aug. 27, 2024

(54) ANTI-COUNTERFEITING SYSTEM FOR BOTTLED PRODUCTS

(71) Applicant: T-Mobile Innovations LLC, Overland Park, KS (US)

(72) Inventor: Zhisheng Chen, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 106 days.

(21) Appl. No.: 17/734,555

(22) Filed: May 2, 2022

(65) Prior Publication Data

US 2023/0351406 A1  Nov. 2, 2023

(51) Int. Cl.
*G06Q 30/018* (2023.01)
*G06K 7/10* (2006.01)
*G06K 19/07* (2006.01)

(52) U.S. Cl.
CPC ....... *G06Q 30/018* (2013.01); *G06K 7/10366* (2013.01); *G06K 19/0709* (2013.01)

(58) Field of Classification Search
CPC .... G06Q 30/018; G06Q 10/08; G06Q 10/087; G06Q 10/0875; G06Q 10/00; G06K 7/10366; G06K 19/0709
See application file for complete search history.

(56) References Cited

U.S. PATENT DOCUMENTS

| | | | |
|---|---|---|---|
| 6,882,128 B1 | 4/2005 | Rahmel et al. | |
| 7,986,935 B1 | 7/2011 | D'Souza et al. | |
| 8,204,794 B1 | 6/2012 | Peng et al. | |
| 8,593,256 B2 | 11/2013 | Isabell | |
| 9,411,992 B1 | 8/2016 | Marek et al. | |
| 9,894,471 B1 | 2/2018 | Zalewski et al. | |
| 10,938,449 B1 * | 3/2021 | Loman | G06K 19/0702 |

(Continued)

FOREIGN PATENT DOCUMENTS

| | | |
|---|---|---|
| EP | 4172863 A1 | 5/2023 |
| EP | 4205031 A1 | 7/2023 |

(Continued)

OTHER PUBLICATIONS

An Approach for Managing Manufacturing Assets through Radio Frequency Energy Harvesting Muhammad Ashhal Tahir, Borja Ramis Ferrer * and Jose Luis Martinez Lastra (Year: 2019).*

(Continued)

*Primary Examiner* — Alexandru Cirnu

(57) ABSTRACT

A container, a closure, and a product system. The system comprises the container; the closure; the product stored in the container and retained within the container by the closure; a first ambient electromagnetic power harvesting (AEPH) chip affixed between the container and the closure in such a way that removing the closure destroys an antenna of the first AEPH chip, wherein the first AEPH chip stores a first authentication code; and a second AEPH chip affixed to one of the container or the closure, wherein the second AEPH chip stores a second authentication code, a reader authorization code, and sourcing information in a static memory portion, wherein the sourcing information identifies the product, the place of manufacture of the product, the date of manufacture of the product, and an identity of the manufacturer of the product.

18 Claims, 7 Drawing Sheets

(56) References Cited

U.S. PATENT DOCUMENTS

| | | | |
|---|---|---|---|
| 11,238,324 | B1 | 2/2022 | Marquardt et al. |
| 11,258,302 | B1 | 2/2022 | Marquardt et al. |
| 11,704,528 | B2 | 7/2023 | Marquardt et al. |
| 11,714,985 | B1 | 8/2023 | Bales et al. |
| 11,757,305 | B2 | 9/2023 | Marquardt et al. |
| 11,900,198 | B2 | 2/2024 | Marquardt et al. |
| 11,924,908 | B1 | 3/2024 | Paczkowski et al. |
| 2004/0155778 | A1 | 8/2004 | Shek et al. |
| 2006/0071925 | A1 | 4/2006 | Wykoff et al. |
| 2006/0134580 | A1 | 6/2006 | Raby et al. |
| 2007/0205902 | A1 | 9/2007 | Cote et al. |
| 2008/0018467 | A1 | 1/2008 | Estevez et al. |
| 2008/0126111 | A1 | 5/2008 | Loda |
| 2008/0129457 | A1 | 6/2008 | Ritter et al. |
| 2009/0096574 | A1 | 4/2009 | Oberle |
| 2009/0315686 | A1 | 12/2009 | Oberle |
| 2010/0090004 | A1 | 4/2010 | Sands et al. |
| 2010/0102123 | A1 | 4/2010 | Skowronek |
| 2011/0181399 | A1* | 7/2011 | Pollack ............. G06K 19/0717 340/10.33 |
| 2012/0018505 | A1 | 1/2012 | Jiang et al. |
| 2013/0084796 | A1 | 4/2013 | Kerr |
| 2013/0320079 | A1 | 12/2013 | Nordin et al. |
| 2014/0134468 | A1 | 5/2014 | Schaefer et al. |
| 2015/0048682 | A1 | 2/2015 | Murley |
| 2015/0069126 | A1 | 3/2015 | Leon |
| 2017/0270323 | A1 | 9/2017 | Butler et al. |
| 2019/0034672 | A1 | 1/2019 | Rokhsaz |
| 2019/0138870 | A1 | 5/2019 | Kuzbari et al. |
| 2019/0149725 | A1 | 5/2019 | Adato et al. |
| 2019/0347454 | A1 | 11/2019 | Mongrenier et al. |
| 2019/0354824 | A1 | 11/2019 | Mohiuddin et al. |
| 2020/0004999 | A1 | 1/2020 | Kawaguchi et al. |
| 2020/0180935 | A1 | 6/2020 | Zumtobel et al. |
| 2020/0219112 | A1 | 7/2020 | Nakayma et al. |
| 2020/0227813 | A1 | 7/2020 | Yehezkely |
| 2020/0265446 | A1 | 8/2020 | Vargas |
| 2021/0019482 | A1* | 1/2021 | Shakedd ................. H02J 7/345 |
| 2021/0019585 | A1* | 1/2021 | Shakedd ............ G08B 13/2482 |
| 2021/0219102 | A1 | 7/2021 | Gion et al. |
| 2021/0224727 | A1 | 7/2021 | Rakhunde et al. |
| 2021/0280307 | A1 | 9/2021 | Hargrove et al. |
| 2021/0342559 | A1 | 11/2021 | Frederick |
| 2022/0109667 | A1 | 4/2022 | Gorog |
| 2022/0121894 | A1 | 4/2022 | Marquardt et al. |
| 2022/0180141 | A1 | 6/2022 | Marquardt et al. |
| 2022/0331841 | A1 | 10/2022 | Filler et al. |
| 2022/0344971 | A1 | 10/2022 | Marquardt et al. |
| 2022/0374030 | A1 | 11/2022 | Lehtonen et al. |
| 2023/0187811 | A1 | 6/2023 | Cohen et al. |
| 2023/0306224 | A1 | 9/2023 | Marquardt et al. |
| 2023/0359982 | A1 | 11/2023 | Mohseni |
| 2024/0020502 | A1 | 1/2024 | Marquardt et al. |
| 2024/0047994 | A1 | 2/2024 | Paczkowski et al. |
| 2024/0127022 | A1 | 4/2024 | Marquardt et al. |

FOREIGN PATENT DOCUMENTS

| | | | |
|---|---|---|---|
| EP | 4278425 | A1 | 11/2023 |
| WO | 2008051598 | A1 | 5/2008 |
| WO | 2008055212 | A2 | 5/2008 |
| WO | 2015187199 | A1 | 12/2015 |
| WO | 2018063449 | A1 | 4/2018 |
| WO | 2018132120 | A1 | 7/2018 |
| WO | 20200208412 | A1 | 10/2020 |
| WO | 2022060475 | A1 | 3/2022 |
| WO | 2022125162 | A1 | 6/2022 |
| WO | 2022231682 | A1 | 11/2022 |

OTHER PUBLICATIONS

Office Action dated Apr. 30, 2020, U.S. Appl. No. 16/158,299, filed Oct. 12, 2018.

Notice of Allowance dated Oct. 30, 2020, U.S. Appl. No. 16/158,299, filed Oct. 12, 2018.

Notice of Allowance dated Oct. 5, 2021, U.S. Appl. No. 17/024,484, filed Sep. 17, 2020.

Notice of Allowance dated Oct. 21, 2021, U.S. Appl. No. 17/240,846, filed Apr. 26, 2021.

Notice of Allowance dated Mar. 7, 2023, U.S. Appl. No. 17/568,019, filed Jan. 4, 2022.

Notice of Allowance dated May 3, 2023, U.S. Appl. No. 17/867,218, filed Jul. 18, 2022.

Office Action dated May 11, 2023, U.S. Appl. No. 17/161,415, filed Jan. 28, 2021.

Office Action dated Jun. 20, 2023, U.S. Appl. No. 17/115,596, filed Dec. 8, 2020.

Notice of Allowance dated May 11, 2023, U.S. Appl. No. 17/571,294, filed Jan. 7, 2022.

Foreign Communication From a Related Counterpart Application, International Search Report and Written Opinion dated Nov. 23, 2021, International Application No. PCT/US2021/044086 filed on Jul. 31, 2021.

Foreign Communication From a Related Counterpart Application, International Search Report and Written Opinion dated Dec. 6, 2021, International Application No. PCT/US2021/051159 filed on Sep. 20, 2021.

Foreign Communication From a Related Counterpart Application, Invitiation to Pay Additional Fees dated May 30, 2022, International Application No. PCT/US2022/017304.

Foreign Communication From a Related Counterpart Application, International Search Report and Written Opinion dated Jul. 21, 2022, International Application No. PCT/US2022/017304.

Foreign Communication From a Related Counterpart Application, International Search Report and Written Opinion dated May 3, 2023, International Application No. PCT/US2023/014517.

Loman, Clinton H., et al., "Battery Coupled Radio Frequency Identity (RFID)," filed Jan. 28, 2021, U.S. Appl. No. 17/161,415.

Marquardt, Ronald, R., et al., "Multi-tier Identities in an RFID Chip," filed Dec. 8, 2020, U.S. Appl. No. 17/115,596.

Marquardt, Ronald, R., et al., "RFID Device with Two-Stage Power Harvesting," filed Jul. 31, 2021, International Application No. PCT/US2021/044086.

Marquardt, Ronald, R., et al., "Multi-tier Identities in an RFID Chip," filed Sep. 20, 2021, International Application No. PCT/US2021/051159.

Marquardt, Ronald, R., et al., "Ambient Electromagnetic Power Harvesting Chip Adaptation Based on Available Power Level," filed Jan. 7, 2022, U.S. Appl. No. 17/571,294.

Marquardt, Ronald, R., et al., "Ambient Electromagnetic Power Harvesting Chip Adaptation Based on Available Power Level," filed Feb. 22, 2022, International Application No. PCT/US2022/017304.

Bales, Mark, R., et al., "System and Method of Controlling Unique Identities of Ambient Electromagnetic Power Harvesting Chips," filed Jul. 18, 2022, U.S. Appl. No. 17/867,218.

Bales, Mark, R., et al., "System and Method of Controlling Lifecycles of Ambient Electromagnetic Power Harvesting Chips," filed Feb. 7, 2023, U.S. Appl. No. 18/165,877.

Bales, Mark, R., et al., "System and Method of Controlling Unique Identities of Ambient Electromagnetic Power Harvesting Chips," filed Jun. 1, 2023, International Application No. PCT/US2023/067789.

Bales, Mark, R., et al., "System and Method of Controlling Unique Identities of Ambient Electromagnetic Power Harvesting Chips," filed Jun. 9, 2023, U.S. Appl. No. 18/332,284.

Balmakhtar, Marouane, et al., "Differentiated and Modulated Spectrum Power Radiation Via MIMO and Beamforming Imposed Upon Ambient Electromagnetic Power Harvesting Chips," filed Apr. 3, 2023, U.S. Appl. No. 18/295,075.

Chen, Zhisheng, "Anti-counterfeiting System for Bottled Products," filed Mar. 3, 2023, International Application No. PCT/US2023/014517.

Balmakhtar, Marouane, et al., "Device and Method for Controlling a Physical Indicator of an Ambient Electromagnetic Power Harvesting Device," filed Apr. 10, 2023, U.S. Appl. No. 18/298,253.

(56) References Cited

OTHER PUBLICATIONS

Office Action dated Sep. 14, 2023, U.S. Appl. No. 17/161,415, filed Jan. 28, 2021.
Notice of Allowance dated Sep. 27, 2023, U.S. Appl. No. 17/115,596, filed Dec. 8, 2020.
Foreign Communication From a Related Counterpart Application, International Search Report and Written Opinion dated Sep. 26, 2023, International Application No. PCT/US2023/067789.
Marquardt, Ronald, R., et al., "RFID Device with Two-Stage Power Harvesting," filed May 24, 2023, U.S. Appl. No. 18/323,268.
"Bales, Mark, R., et al., "Ambient Electromagnetic Power Harvesting Device for Collecting and Forwarding Data," filed May 30, 2023, U.S. Appl. No. 18/325,936".
Office Action dated Oct. 17, 2023, U.S. Appl. No. 17/165,877, filed Feb. 7, 2023.
Marquardt, Ronald, R., et al., "Multi-tier Identities in an RFID Chip," filed Dec. 20, 2023, U.S. Appl. No. 18/325,936.
Final Office Action dated Apr. 1, 2024, U.S. Appl. No. 17/161,415, filed Jan. 28, 2021.
Office Action dated Apr. 8, 2024, U.S. Appl. No. 17/165,877, filed Feb. 7, 2023.

\* cited by examiner

ANTI-COUNTERFEITING SYSTEM FOR BOTTLED PRODUCTS

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio frequency identity (RFID) chips conventionally are divided into passive RFIDs and active RFIDs. Active RFIDs have their own autonomous power supply, such as a battery. Passive RFIDs harvest electric power from ambient electromagnetic waves, for example electromagnetic waves emitted by a proximate reader or scanner device. The typical passive RFID has limited capabilities and stores 2 MB or less of data. RFIDs can be manufactured inexpensively and are small enough to be affixed to and concealed within products such as clothing or sporting goods to support inventory tracking and product identification.

SUMMARY

In an embodiment, a method of validating authenticity of a product stored in a container having a closure is disclosed. The method comprises reading a first authentication code by a reader-writer device from a first ambient electromagnetic power harvesting (AEPH) chip affixed to at least one of the container or the closure, wherein the first AEPH chip extracts electric power from an ambient radio frequency emission and the first authentication code is stored in a static portion of memory of the first AEPH chip and reading a second authentication code by the reader-writer device from a second AEPH chip affixed to the container, wherein the second AEPH chip extracts electric power from the ambient radio frequency emission and the second authentication code is stored in a static portion of memory of the second AEPH chip. The method further comprises sending the first authentication code and the second authentication code by the reader-writer device in an authentication service request message to an authentication service, receiving an authentication success message by the reader-writer device from the authentication service, wherein the authentication service accessed a data store to confirm the association of the first authentication code and the second authentication code for the product, and completing a product distribution action on the product based on receiving the authentication success message.

In another embodiment, a method of storing a product in a container having a closure and distributing the product while maintaining product sourcing information and product provenance information with the container and closure is disclosed. The method comprises writing sourcing information in a static memory portion of a first ambient electromagnetic power harvesting (AEPH) chip affixed to the container by a first writer device, wherein the sourcing information identifies the product, the place of manufacture of the product, the date of manufacture of the product, and an identity of the manufacturer and wherein the first AEPH chip is configured to extract electric power from an ambient radio frequency emission and writing a first transport information in a dynamic memory portion of a second AEPH chip affixed to the container or to the closure by a second writer device, wherein the first transport information comprises information about transportation from a point of manufacture of the product to a wholesale distribution point. The method further comprises writing a second transport information in the dynamic memory portion of the second AEPH chip by a third writer device, wherein the second transport information comprises information about transportation from the wholesale distribution point to a retail sale point and reading the first transport information and the second transport information at a point of sale device and presenting the first transport information and the second transport information on a display screen for viewing by a retail customer. The method further comprises destroying the ability of reading from the second AEPH chip by removing the closure for a first time since installing the second AEPH chip, after destroying the ability of reading from the second AEPH chip, reading the sourcing information from the first AEPH chip by an application executing on a wireless communication device, and presenting the sourcing information by the wireless communication device to the retail customer.

In yet another embodiment, a container, a closure, and a product system is disclosed. The system comprises the container, the closure, and the product stored in the container and retained within the container by the closure. The system further comprises a first ambient electromagnetic power harvesting (AEPH) chip affixed between the container and the closure in such a way that removing the closure destroys an antenna of the first AEPH chip, wherein the first AEPH chip stores transport information in a dynamic memory portion and a second AEPH chip affixed to one of the container or the closure, wherein the second AEPH chip stores sourcing information in a static memory portion, wherein the sourcing information identifies the product, the place of manufacture of the product, the date of manufacture of the product, and an identity of the manufacturer of the product.

In yet another embodiment, a method of storing a product in a container having a closure and distributing the product while maintaining product sourcing information and product provenance information with the container and closure is disclosed. The method comprises writing a first authentication code by a first writer device to a first ambient electromagnetic power harvesting (AEPH) chip affixed to the container, wherein the first AEPH chip is configured to extract electric power from an ambient radio frequency emission; after writing the first authentication code to the first AEPH chip, rendering by the first writer device the first AEPH chip read only; and writing a second authentication code and sourcing information in a static memory portion of a second AEPH chip affixed to the container or to a closure of the container by the first writer device, wherein the sourcing information identifies the product, the place of manufacture of the product, the date of manufacture of the product, and an identity of the manufacturer and wherein the second AEPH chip is configured to extract electric power from an ambient radio frequency emission. The method further comprises writing a first transport information in a dynamic memory portion of the second AEPH chip by a second writer device, wherein the first transport information comprises information about transportation from a point of manufacture of the product to a wholesale distribution point; and writing a second transport information in the dynamic memory portion of the second AEPH chip by a third writer device, wherein the second transport information comprises information about transportation from the wholesale distribution point to a retail sale point. The method further comprises reading the first transport information and the second transport information at a point of sale device and presenting the first transport information and the second transport information on a display screen for viewing by a retail customer; destroying the ability of reading from the first AEPH chip by removing the closure for a first time since installing the first AEPH chip; after destroying the ability of reading from the first AEPH chip, reading the sourcing information from the second AEPH chip by an application executing on a wireless communication device; and presenting the sourcing information by the wireless communication device to the retail customer.

In yet another embodiment, a container, a closure, and a product system is disclosed. The system comprises the container, the closure, the product stored in the container and retained within the container by the closure, a first ambient electromagnetic power harvesting (AEPH) chip, and a second AEPH chip. The first AEPH chip is affixed between the container and the closure in such a way that removing the closure destroys an antenna of the first AEPH chip, wherein the first AEPH chip stores a first authentication code. The second AEPH chip is affixed to one of the container or the closure, wherein the second AEPH chip stores a second authentication code, a reader authorization code, and sourcing information in a static memory portion, wherein the sourcing information identifies the product, the place of manufacture of the product, the date of manufacture of the product, and an identity of the manufacturer of the product, wherein the second AEPH chip is configured to receive a request for information from a reader comprising an authorization code, to compare the authorization code received in the request to the stored reader authorization code, and when the authorization code received in the request matches the stored reader authorization code, to transmit requested information at a frequency above 5 GHz and less than 200 GHz.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
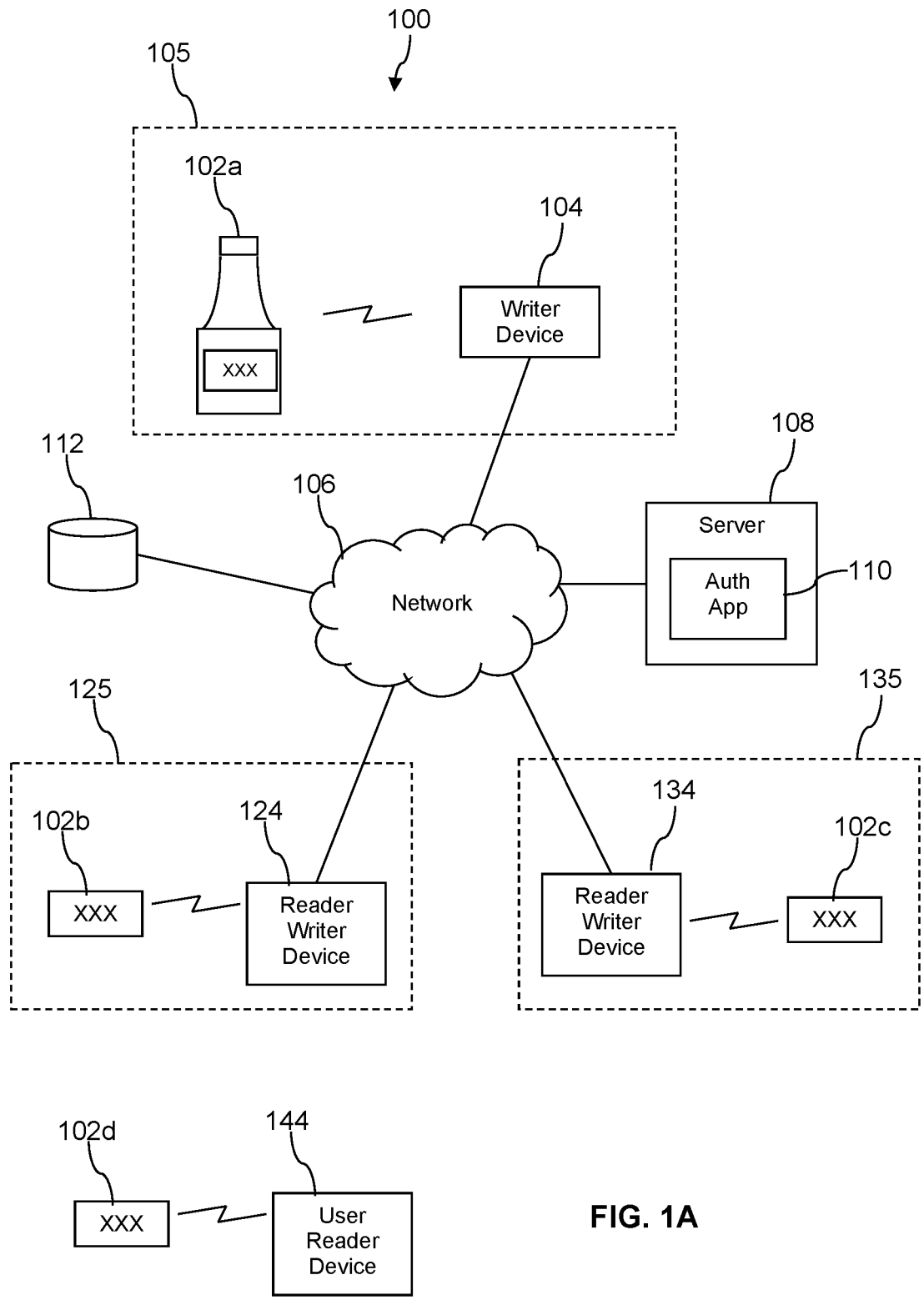
FIG. 1A is a block diagram of an anti-counterfeiting system for bottled products according to an embodiment of the disclosure.
Figure 1B:
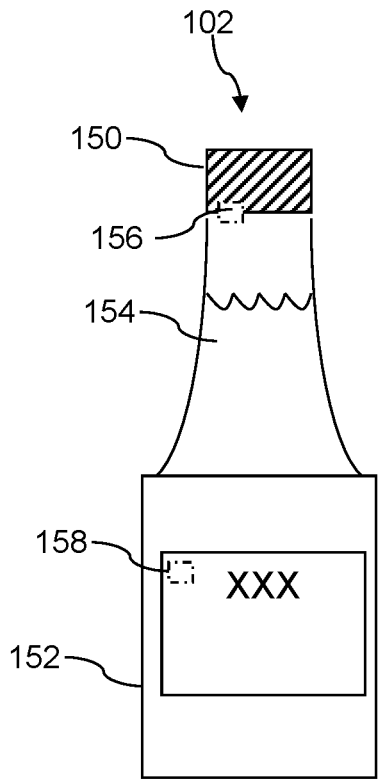
FIG. 1B is an illustration of a bottled product provided with anti-counterfeiting ambient electromagnetic power harvesting (AEPH) chips according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

High-value bottled products such as prescription drugs, elite wines, and luxury food products are being counterfeited. Sometimes, this involves opening the container the product is stored in, removing the high-value product, replacing the high-value product with an ersatz substitute, and resealing the container in such a way that the closure looks intact. Sometimes there never is any of the high-value product in the container at all, the ersatz substitute is placed in a container having a label and appearance that imitate the genuine product packaging, and the container is closed such that the closure looks intact.

The present disclosure teaches using ambient electromagnetic power harvesting (AEPH) chips that have some of the properties of RFIDs to thwart counterfeiting bottled products. The AEPH chips taught herein harvest energy to operate from ambient electromagnetic fields emitted by a reader or from ambient electromagnetic power available from cellular radio frequency bands. In an embodiment, the AEPH chips harvest energy from ambient electromagnetic power associated with cellular communications in the frequency range of 2.3 GHz to 2.6 GHz. In other embodiments, however, the AEPH chips may harvest energy from ambient electromagnetic power in other frequency bands, for example in new frequency bands that are being assigned currently or in the future to cellular communication operations.

In an embodiment, the AEPH chips harvest energy from ambient electromagnetic power in a frequency band from about 2.495 GHz to about 2.5 GHz. In an embodiment, a reader may transmit high levels of electromagnetic power in the 2.495 GHz to 2.5 GHz frequency range which permits a higher operation level of the AEPH chips due to more incident power, for example in close proximity to other AEPH chips and other bottled products (some of which may contain liquid that absorb and block some of the ambient electromagnetic power in the 2.495 GHz to 2.5 GHz power range). In an embodiment, the AEPH chips may reply to requests for information from a reader at a different frequency than the frequency from which they harvest electromagnetic power, for example transmitting at a frequency above 6 GHz and less than 200 GHz, whereby to avoid electro-magnetic absorption bands associated with liquids such as wine or spirits which contain a significant percentage of water. The AEPH chips taught herein have a write-once memory portion as well as an area of memory that can be written to multiple times.

It is understood that the several teachings disclosed herein need not all be combined in the same solution. Said in other words, benefits can be obtained by using only one of the innovations disclosed herein without necessarily combining all the innovations in one solution. For example, for many situations, at least some of the benefits of the teachings herein can be gained from an AEPH chip that has only a plurality of write-once memory sections or portions and does not contain an area of memory that can be written to multiple times. For example, in many situations benefits can be gained with an AEPH chip built at a factory where paired codes of two different AEPH chips affixed to the same bottle are tracked in a datastore to attest authenticity of a product at a retail location (e.g., a first authentication code stored in a first AEPH chip embedded in a closure pairs with a second authentication code of a second stored in a second AEPH chip embedded in a label on the bottle).

In an embodiment, an AEPH chip is affixed to a container and closure in such a way that opening the bottle destroys the antenna of the AEPH chip and prevents its communicating with a reader. For example, the AEPH chip and/or antenna may be ironed onto a bottle closure (e.g., a metal twist cap or a cork) such that an antenna of the AEPH chip is broken when the cap or cork is removed. In this case, the inability to electronically read from the AEPH chip implies that the container has been opened. In an embodiment, there may be two AEPH chips coupled to the container. The first AEPH chip would be configured as already described such that its antenna breaks after the closure is removed. The second AEPH chip, however, would remain functional and information could be read from the second AEPH chip after the container was opened and the contained product consumed. This may be useful in tracking down information when, for example, the user wishes to reorder the same stock such as replace an excellent bottle of wine consumed at a restaurant.

In an embodiment, the first AEPH chip and the second AEPH chip store authentication codes that are known in a back-end data store. The authentication codes may be written into a static memory portion of the AEPH chips that is a write once kind of memory. This static memory portion may be disabled for writing after an initial writing of information is completed, for example by blowing fuses in a write bus or write line of the static memory portion. The authentication codes are confidential and cannot be read by unauthorized electronic reader devices. For example, the electronic reader devices may need to have a restricted application installed to read the authentication codes (e.g., the restricted application is only available from a controlled source, such as the operator of the back-end data store). For example, the electronic reader devices may need to present an authorization token to the AEPH chips before they transmit their authentication codes. Authorized electronic reader devices (as well as reader-writer devices) can scan the authentication codes, send an authentication request containing the two authentication codes to a back-end authentication service having access to the back-end data store that stores associations of pairs of authentication codes, and receive an authentication result that is positive if the authentication codes match each other and/or match with a product identity sent with the authentication request. It is understood that authentication codes matching each other may mean the authentication code of the first AEPH chip is the same as the authentication code of the second AEPH chip or may mean the authentication code of the first AEPH chip is different from the authentication of the second AEPH chip but that these two different authentication codes are associated together in the back-end data store. In an embodiment, when the two authentication codes of two AEPH chips associated with a same container are different, one of the authentication codes can be used to look up the other associated code in the back-end data store. Alternatively, an identity that is distinct from the two authentication codes and is stored in the AEPH chips may be used to look up an association between the first authentication code and the second authentication code. In an embodiment, the authentication codes of AEPH chips need not be unique. For example, a $120,000^{th}$ instance of a container may have two AEPH chips having the same pair of authentication codes as the two AEPH chips of a $27,354^{th}$ instance of a container. This is because the chances of correctly guessing what the proper match stored in the back-end data store in such a quasi-unique authentication code context would be so low as to make successful counterfeiting impracticable.

This process can prevent counterfeiters opening the container, breaking the first AEPH chip, removing the high-value product, replacing the high-value product with an ersatz substitute, and installing a replacement for the broken first AEPH chip. They cannot successfully spoof the broken first AEPH chip, because they cannot guess the proper authentication code to write into the replacement AEPH chip. Additionally, counterfeiters will not be granted access to enter authentication data into the back-end authentication service (e.g., this may be restricted to trusted producers of the high-value products such as a trustworthy wine distributor, a trustworthy pharmaceutical manufacturer, a trustworthy food distributor), and hence they cannot populate spoofed credentials that associate counterfeit AEPH chips affixed to ersatz bottled products.

In an embodiment, when the container is transported, transport information is stored in at least one of the AEPH chips affixed to the container. For example, information about transportation from the manufacturer to a warehouse or wholesaler may be stored in at least one of the AEPH chips. For example, information about transportation from the warehouse or wholesaler to a retail store may be stored in at least one of the AEPH chips. The transportation information may identify a starting point and an ending point for the transportation, a date, a transportation or shipping company, and a date. In an embodiment, the matching of the authentication codes of the two AEPH chips is checked at the starting point of transportation and the result stored in at least one of the AEPH chips, and the matching of the authentication codes of the two AEPH chips is checked again at the ending point of transportation and the result stored in at least one of the AEPH chips. In this way, a point at which the authentication codes stopped matching to each other can be identified, and further action may be taken to not only stop fraud but zero in on the perpetrator of the fraud.

Because the AEPH chips are configured to be read at a distance, an authorized reader can read each of the AEPH chips associated with a large shipment of packaged high-value products and authenticate them quickly with the back-end authorization service. In an embodiment, the reader may employ an antenna array and/or multiple input multiple output (MIMO) communication techniques to avoid signal collisions among a large number of AEPH chips in a shipment replying at a same time. For example, the AEPH chips can be read at a distance of up to 30 feet. In an embodiment, the reader may transmit electromagnetic energy at a relatively high power level in the 2.495 GHz to 2.5 GHz frequency range so AEPH chips receive more power to both receive information requests from the reader successfully and to transmit with enough power to be successfully received by the reader across a 30 foot gap.

This system can allow detection and foiling of counterfeiting attempts at different levels of product distribution. For example, product received at a wholesale depot from a manufacturer can be scanned and discovered to be counterfeit, interdicting an attempt to introduce a counterfeit product by an unscrupulous manufacturer or by a shipping company. For example, product received at a retail store from a wholesale depot can be scanned and discovered to be counterfeit, interdicting an attempt to introduce a counterfeit product by an unscrupulous wholesaler or product delivery company. This system can protect both an honest wholesaler business and an honest retailer business. This system can preserve the value of a producer's product by preventing ersatz products propagating to end users and devaluing the product in the user community opinion.

This disclosure teaches a particular technical solution to the technical problem of tracking high-value products efficiently and reliably using electronic scanning systems. The technical problem is thwarting attempts to pass off ersatz products as high-end products when formerly there was no simple, practicable way of an end customer verifying for himself or herself that the product isn't counterfeit. Does this $100 bottle labeled as a top-ranked Châteauneuf-du-Pape red wine contain what it claims or does it contain a flabby, unstructured Zinfandel wine made in California's Central Valley? Does this $100 bottle labeled as white truffles contain what it claims or something far inferior? The technical solutions taught herein apply a variety of combinations of new AEPH chip features and backend data store operations to conveniently track and monitor provenance and authenticity of bottled products.

In addition to reading information from the AEPH chips, a reader-writer device may write distribution information into a dynamic memory portion of the AEPH chip or chips (e.g., a memory portion that can be written to multiple times, including overwriting previously written data and appending to data previously written to the dynamic memory portion). The distribution information can indicate dates and times of distribution events such as pick-up of product at a production or manufacturing site by a shipper, delivery of product at a warehouse of a wholesaler, pick-up of product at a warehouse by a shipper, and delivery at a retail store, and other distribution information. This distribution information may be useful in maintaining a chain of possession that documents provenance of high-value products.

Turning now to FIG. 1, an anti-counterfeiting system for bottled products 100 is described. In an embodiment, the system 100 comprises a bottled product 102a that is produced at a production location 105. The bottled product 102a is provided with one or more ambient electromagnetic power harvesting (AEPH) chips that has information written to it by a writer device 104. The information may be written by the writer device 104 to a static memory portion of a non-transitory memory of the AEPH chips (e.g., a portion of memory that can only be written to once). The information may comprise a stock keeping unit (SKU) identity or other product identity, a serial number or other unique identifier of this particular instance of the bottled product 102a. The information may comprise a date of production and a production location identity. The information may comprise an identity of a manufacturer. The information may comprise an authentication code for each of the one or more AEPH chips affixed to the bottled product 102a. In an embodiment, the authentication codes may be different for the AEPH chips associated with the same bottled product 102a. The writer device 104 may communicate via a network 106 with an authentication application 110 executing on a computer system 108.

The writer device 104 may propagate some of the information that it writes into the one or more AEPH chips affixed to the bottled product 102a to the authentication application 110, and the authentication application 110 may store the information as a record in a data store 112. For example, record stored in the data store 112 may comprise a first authentication code associated with a first AEPH chip affixed to the bottled product 102a, a second authentication code associated with a second AEPH chip affixed to the bottled product 102a, and a SKU identity or other product identity. The bottled product 102a may be packaged for shipping, for example to a warehouse location, and the writer device 104 may write information into the AEPH chips such as when the bottled products 102a were loaded for out shipment, an identity of a shipping company, and a destination of the shipment (e.g., an identity of a wholesaler or an identity of a warehouse location). In some contexts, the authentication application 110 may be referred to as a back-end authentication service or simply an authentication service, and the data store 112 may be referred to in some contexts as a back-end data store.

The bottled product 102a may be shipped from the production location 105 to a warehouse location 125, where the bottled product 102a may be referred to as bottled product 102b. This is the same bottled product, but at a different point in time and at a different stage of a distribution chain transiting between the production location 105 and an end user or customer. At the warehouse location 125, the system 100 further comprises a reader-writer device 124. A wholesaler may use the reader-writer device 124 to read at least some of the information stored in the one or more AEPH chips affixed to the bottled product 102b and to send some of the information to the authentication application 110. The authentication application 110 can access the data store 112 to see if a record exists for the information sent from the reader-writer device 124. If a record is present in the data store 112 that associates an authentication code with the SKU or product identity (when only a single AEPH chip is affixed to the bottled product 102b) or that associates two authentication codes with each other and with the SKU or product identity, then the authentication application 110 sends an authentication success message to the reader-writer device 124, indicating that the bottled product 102b is authentic. Otherwise, the authentication application 110 sends an authentication failure message to the reader-writer device 124, indicating that the bottled product 102b is probably a counterfeit.

In an embodiment where two AEPH chips are affixed to the bottled product 102b, two authentication codes may be read by the reader-writer device 124. In an embodiment, if only one authentication code is read by the reader-writer device 124 from the bottled product 102b, the reader-writer device 124 may infer that the bottled product 102b has been tampered with, based on not being able to read the second authentication code (e.g., because the associated AEPH chip has had its antenna destroyed when the closure was opened). In this case the reader-writer device 124 may deem the bottled product 102b to be unauthenticated (e.g., a likely counterfeit) on this basis and omit sending an authentication message to the authentication application 110. Alternatively, the reader-writer device 124 may not make this decision and instead send whatever information it reads in the authentication message to the authentication application 110, deferring the decision to deem the subject bottled product 102b inauthentic to the authentication application 110.

The reader-writer device 124 may read the AEPH chips of a large number of bottled products 102b at about the same time, for example at the open door of a semi-truck trailer, and authenticate all of these bottled products 102b at about the same time with the authentication application 110. If one bottled product 102b or a threshold percent of the bottled products 102b in a load are deemed unauthenticated (e.g., likely counterfeit products), the shipment can be rejected at the loading dock and sent away without receiving the bottled products 102b into the warehouse. In an embodiment, the threshold percent of unauthenticated bottled products may be 1%, 2%, 5%, 8%, 10%, 15%, 20%, 25%, 30%, 33%, 35%, or some other percentage. In an embodiment, different kinds of bottled products may have different threshold percentages defined. In an embodiment, different points in the distribution chain may have different threshold percentages defined.

In rejecting the entire shipment in this way, the problem for straightening out the difficulty falls upon the shipper and/or the source, one of which seemingly is responsible for perpetrating counterfeit products. This can protect the wholesaler and the wholesaler's retail customers. This can also lead to shaking out unscrupulous shippers who would infiltrate counterfeits, and also shake out product sources who would likely be boycotted by shipping companies if the shipping companies got stuck with the shipping bill for counterfeit products if the source refused to make proper amends.

If the bottled product 102b is authenticated, it may be introduced into the warehouse. The reader-writer 124 may write information into one of the AEPH chip affixed to the bottled product 102b or to more than one of the AEPH chips affixed to the bottled product 102b indicating when the bottled product 102b was received at the warehouse location 125, the results of the authentication of the bottled product 102b, and other distribution event information. When the bottled product 102b is loaded for shipping, for example to a retail store, the reader-writer device 124 may write information into the AEPH chip(s) affixed to the bottled product 102b indicating a date of out shipment, a retail store destination, and a distribution party responsible for carrying the bottled product 102b to the retail store.

The bottled product 102b may be distributed from the warehouse location 125 to a retail store location 135, where the bottled product 102b may be referred to as bottled product 102c. This is the same bottled product as bottled product 102a and bottled product 102b, but at a different point in time and at a different stage of the distribution chain. At the retail store location 135, the system 100 further comprises a reader-writer device 134. At the retail store location 135, the reader-write device 134 may read at least some of the information stored in the one or more AEPH chips affixed to the bottled product 102c and to send at least some of the information read to the authentication application 110. The authentication application 110 can access the data store 112 to see if a record exists for the information sent from the reader-writer device 134. The authentication application 110 can deem the bottled product 102c authenticated or unauthenticated (e.g., likely counterfeit) as was described above with reference to receiving of bottled product 102b at the warehouse location 125. If one bottled product 102c or a threshold percentage of bottled products 102c is deemed unauthentic, the entire load of bottled product 102c may be rejected by the retail store location 135, leaving the wholesaler and/or the shipper to figure out who cheated and introduced counterfeit goods into the distribution chain, but in any case, obviating the retail store 135 being victimized by receiving counterfeit bottled products 102c. The reader-writer 134 can write information into the AEPH chips affixed to the bottled product 102c indicating when it was received, from what warehouse location, delivered by what shipper.

When a customer purchases the bottled product 102c at the retail store location 135, the reader-writer device 134 may conduct an authentication of that specific bottled product 102c and present on-screen results that the customer can observe, such as validation that the bottled product 102c has an uninterrupted chain of possession or a certified provenance detailing times of transit. This can indicate that the bottled product 102c has never been opened, in the case where two AEPH chips are attached to the same item of bottled product 102c, where one of the AEPH chips would be broken if the closure had been removed at any point since the source location 105. This can improve customer confidence in the authenticity of the bottled product 102c and a willingness to pay top prices for high-value products such as pharmaceuticals, high-value wine, high-value spirits, or high-value food products.

After the customer purchases the bottled product 102c it may be represented as bottled product 102d. A customer may have a reader application installed on a personal device, for example a smart phone, that can read some of the information stored in the AEPH chip(s) affixed to the bottled product 102d. For example, the information may indicate a manufacturer and a manufacture date. For example, the information may indicate a vineyard name, commune name, regional name, and country name as well as a vintage and any modifications such as a "reserve" designation or special cuvée designation. This may be useful at a restaurant, for example, for the user to scan and save information about the bottled product 102d so he or she can purchase more of the same product at a later time, for example at a wine shop. It is understood that the system 100 can comprise any number of producer locations 105, bottled products 102, write devices 104, warehouse locations 125, reader-writer devices 124, retail store locations 135, reader-writer devices 134, and user reader devices 144. The computer system 108, the writer device 104, the reader-writer device 124, and the reader-writer device 134 may be implemented as computer systems. In an embodiment, the writer device 104, the reader-writer device 124, and the reader-writer device 134 may have a form factor like a handheld computer or mobile communication device but notwithstanding share many architectural features with a computer system. Computer systems are described further hereinafter. The user reader device 144 may be a smart phone, a wearable computer, a headset computer, a laptop computer, a notebook computer, or a tablet computer.

Turning now to FIG. 1B, FIG. 1C, FIG. 1D, and FIG. 1E, further details about the bottled product 102 and the one or more AEPH chips affixed to the bottled product 102 are described. In an embodiment, the bottled product 102 (which may be any of bottled product 102a, 102b, 102c, 102d, since these different labels refer to the same item of bottled product at different points in the distribution chain) comprises a closure 150, a container 152 (e.g., a bottle), and a product 154. The closure 150 may be a screw cap, a cork, or a different closure. The container 152 may be a plastic bottle, a glass bottle, a ceramic bottle, or a bottle made of some other material. The product 154 may be any product such as wine, liquor, spirits, pharmaceutical product (e.g., prescription drugs), or food product. In an embodiment, the product 154 may be a high-value product such as prestigious wines such as Château Latour, La Tâche, or Biondi-Santi Tenuta Greppo riserva from exceptional vintages. In an embodiment, the product 154 may be a high-value product such as caviar or truffles. It is understood that the system 100 may be used to authenticate bottled products 102 of different categories of high-value products. For example, the same system 100 may be used to authenticate a bottle of La Tache, a container of high-value prescription medication, and a bottle of premium black truffles.

Figure 1C:
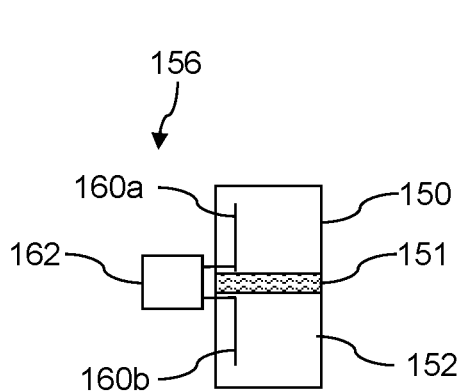
FIG. 1C is an illustration of an anti-counterfeiting ambient AEPH chip affixed at the junction of a container and a closure according to an embodiment of the disclosure.

In an embodiment, a first AEPH chip 156 is affixed to the closure 150 in such a way that the capability to read from and write to the first AEPH chip 156 is destroyed when the closure 150 is loosened. For example, the first AEPH chip 156 may be ironed onto the joint between the closure 150 and the container 152, such that an antenna of the first AEPH chip 156 is partially affixed to the closure 150 and partially affixed to the container 152. When the closure 150 is pulled out or screwed off, even partially, the antenna may be broken, thereby destroying the capability to read from and write to the first AEPH chip 156. It is a teaching of the present disclosure that the destruction of the capability to read from and write to the first AEPH chip 156 in this way can be used to infer a loss of integrity of the closure 150 and therefore the possibility of introduction of an ersatz substitute for the actual product 154. As seen in FIG. 1C, the first AEPH chip 156 may comprise a first antenna feature 160a affixed to the closure 150 and a second antenna feature 160b affixed to the container 152. There may be a seam or gap 151 between the closure 150 and the container 152. The first AEPH chip 156 may further comprise a chip portion 162 to which the antenna features 160a, 160b are connected. In an embodiment, the antenna is a dipole antenna and the antenna features 160a, 160b are two different branches of the dipole antenna. In another embodiment, a different type of antenna may be employed, and the way in which the antenna is attached to the closure 150 and the container 152 may be different.

In an embodiment, a second AEPH chip 158 is affixed to the bottled product 102, for example proximate to or under a label on the container 152. Alternatively, the second AEPH chip 158 may be affixed to another place on the bottled product 102. The second AEPH chip 158 may be substantially similar to the first AEPH chip 158.

Figure 1D:
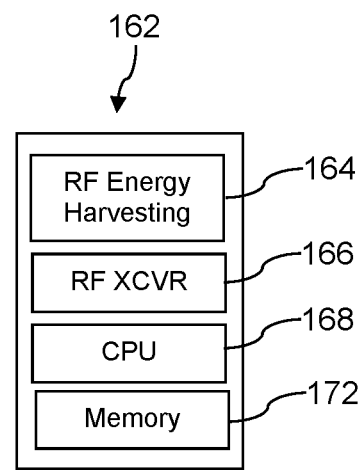
FIG. 1D is a block diagram of an anti-counterfeiting AEPH chip according to an embodiment of the disclosure.

The chip portion 162, as seen in FIG. 1D, may comprise a radio frequency electromagnetic power harvesting portion 164, a radio transceiver portion 166, a processor portion 168, and a memory portion 172. The radio frequency electromagnetic power harvesting portion 164 may receive electromagnetic power emitted by the writer device 104, the reader-writer device 124, and/or the reader-writer device 134. The radio frequency electromagnetic power harvesting portion 164 may receive electromagnetic power emitted by cell sites and other mobile phones, including the user reader device 144. For example, in an embodiment, the radio frequency electromagnetic power harvesting portion 164 may receive electromagnetic power from cell sites and mobile phones in a frequency band from 2.3 GHz to 2.6 GHz. In an embodiment, the radio frequency electromagnetic power harvesting portion 164 may receive electromagnetic power in the frequency band from 2.495 GHz to 2.5 GHz. In an embodiment, the frequency band 2.495 GHz to 2.5 GHz may be a frequency band that is permitted higher energy emission that can desirably be exploited to energize and read the AEPH chips at a greater stand-off distance. In other embodiments, however, the AEPH chips may harvest energy from ambient electromagnetic power in other frequency bands, for example in new frequency bands that are being assigned currently or in the future to cellular communication operations. The radio frequency electromagnetic power harvesting portion 164 transforms harvested electromagnetic power to electric power that it distributes to power on the chip portion 162.

The radio transceiver 166 is able to receive information transmitted wirelessly by the writer device 104. The radio transceiver 166 is able to receive information from and transmit information to the reader-writer device 124 and the reader-writer device 134. In an embodiment, the radio transceiver 166 is able to transmit information to the user reader device 144. The radio transceiver 166 may transmit on a different frequency band than the frequency band the radio frequency electromagnetic power harvesting portion 164 generates electric power from. The processor 168 may execute logic stored in the chip portion 162, for example to manage the electromagnetic power harvesting portion 162, the radio transceiver portion 166, and the memory portion 172.

Figure 1E:
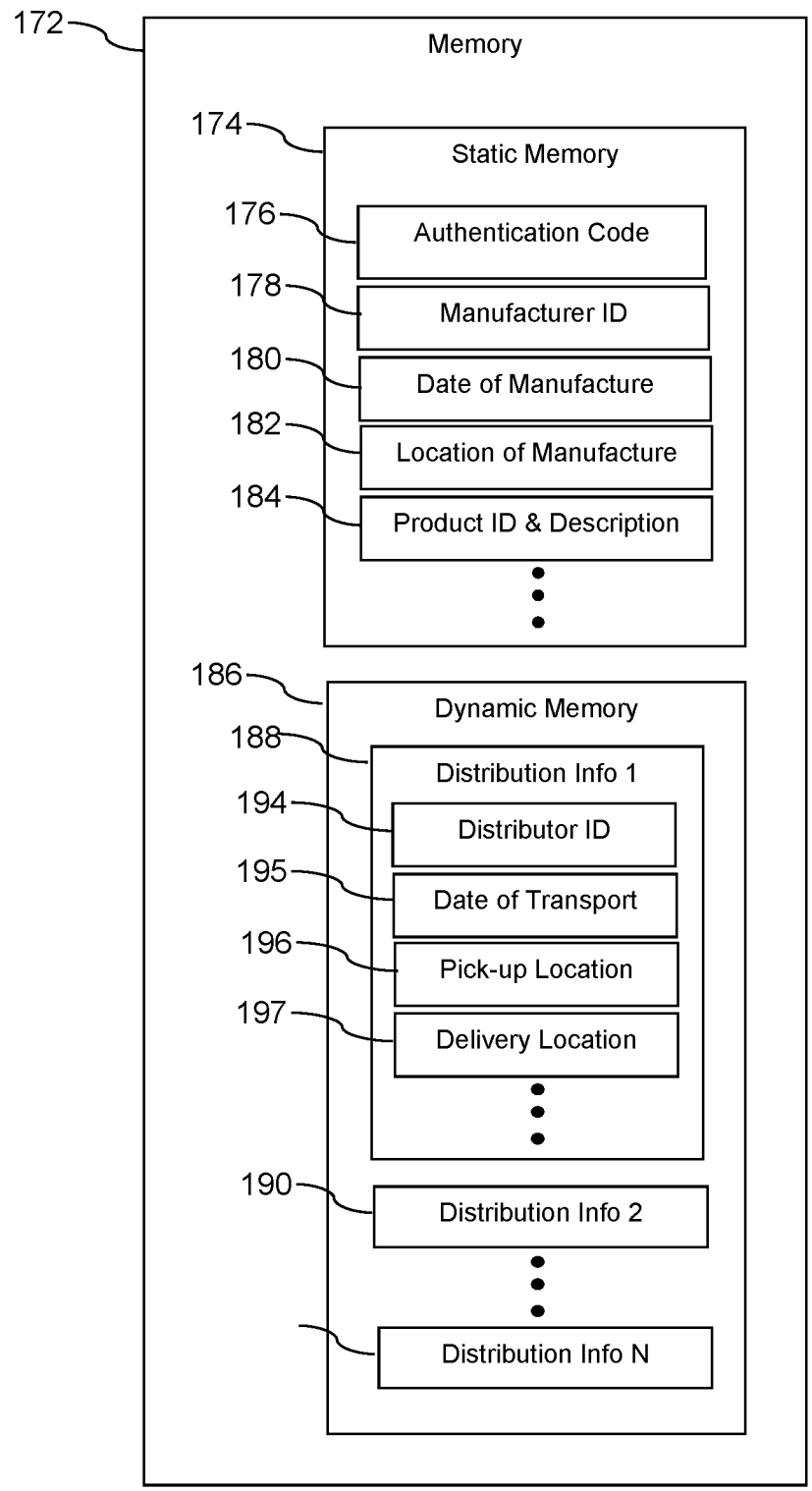
FIG. 1E is a block diagram of a memory architecture of an anti-counterfeiting AEPH chip according to an embodiment of the disclosure.

As seen in FIG. 1E, the memory portion 172 comprises a static memory portion 174 and a dynamic memory portion 186. The static memory portion 174 is a portion of memory that can be written only once and thereafter is no-longer able to be written to. In an embodiment, this write once feature may be achieved by the writer device 104 invoking a special command of the interface to the static memory portion 174 to disable writing. In an embodiment, this write once feature may be achieved by the writer device 104 writing to a specific location in the static memory portion 174 using an elevated voltage which causes some portion of the writing circuitry associated with the static memory portion 174 to be destroyed, for example by blowing fuses in a write input bus or write input line connected to the static memory portion 174. In another embodiment, a different mechanism for disabling write functionality after an initial writing to the static memory portion 174 has been successfully completed. The dynamic memory portion 186 is a portion of the memory 172 that can be written to multiple times. The multiple writings to the dynamic memory portion 186 can include both overwriting a previously written location in the dynamic memory portion 186 and writing to different locations in the dynamic memory portion 186 that had not been written to previously.

Both the static memory portion 174 and the dynamic memory portion 186 are non-transitory memory portions. Said in other words, when the AEPH chip is not powered for an extended period of time (e.g., minutes, hours, days, weeks), the data written into the static memory portion 174 and the data written into the dynamic memory portion 186 remains stored, and when the AEPH chip is again energized, the stored data is readable by a properly authenticated and authorized reader-writer device. It is acknowledged that this distinction between the static memory portion 174 and the dynamic memory portion 186 may conflict with semiconductor industry terminology related to static RAM devices versus dynamic RAM devices. In traditional semiconductor industry terminology, static RAM devices may refer to memories that can be written to multiple times, and dynamic RAM devices may refer to memories that lose the data that is written to them if this data is not refreshed periodically at relatively short intervals. But the usage in this disclosure of the terms "static memory portion" and "dynamic memory portion" are distinct from those SRAM and DRAM terms and is clearly defined as set forth above. It seems this usage is clearer and more succinct than alternative terms—such as "write once memory" or "write one or more times memory"—that otherwise might be used to describe the AEPH chip of this disclosure.

In an embodiment, the static memory portion 174 comprises an authentication code 176, a manufacturer identity 178, a date of manufacture 180, a location of manufacture 182, and/or a product identity and description 184. The product identity and description 184 may comprise a SKU identity. The product identity and description 184 may comprise a name of a drug, a food item, or a wine. The static memory portion 172 may comprise a serial number of the bottled product 102. In an embodiment, the information stored in the static memory portion 172 is considered to comprise unchanging biographical information.

The dynamic memory portion 186 may comprise a series of different blocks of information written into the dynamic memory portion 186 at different times, possibly by different writers 104 and/or reader-writers 124, 134. For example, the dynamic memory portion 186 may comprise a first distribution information block 188, a second distribution information block 190, and a third distribution information block 192. It is understood that the dynamic memory portion 186 may comprise any number of distribution information blocks. Different distribution information blocks may comprise different fields and different numbers of fields. As an example, the first distribution information block 188 comprises a distributor identity 194, a date of transport 195, a pick-up location 196, and a delivery location 197. It is understood that other distribution information blocks may have fewer or more fields. The distribution information blocks may be written by the writer device 104, the reader-writer device 124, and/or the reader-writer device 134. As an example, the first distribution information block 188 may be written to by the writer device 104 at the production location 105 when shipping the bottled product 102a out; the second distribution information block 190 may be written to by the reader-writer device 124 when receiving the bottled product 102b out; and the third distribution information block 192 may be written to by the reader-writer device 124 when shipping out the bottled product 102b.

Figure 2:
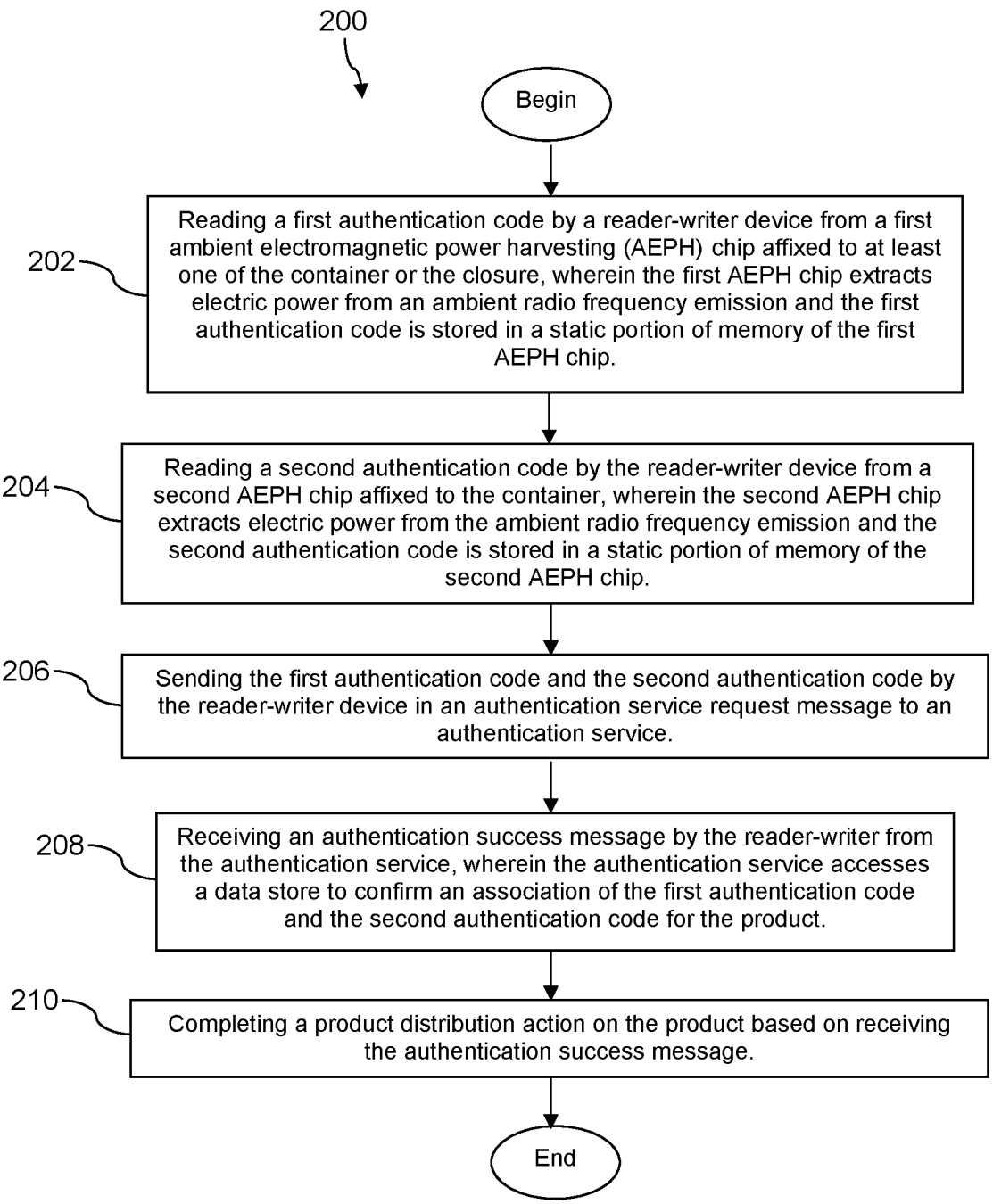
FIG. 2 is a flow chart of a method according to an embodiment of the disclosure.

Turning now to FIG. 2, a method 200 is described. In an embodiment, the method 200 is a method of validating authenticity of a product stored in a container having a closure. In an embodiment, the product is a pharmaceutical product (e.g., prescription medication or prescription drug), a wine product, an alcoholic liquor product, or a food product. In an embodiment, the product is a high-value product. At block 202, the method 200 comprises reading a first authentication code by a reader-writer device from a first ambient electromagnetic power harvesting (AEPH) chip affixed to at least one of the container or the closure, wherein the first AEPH chip extracts electric power from an ambient radio frequency emission and the first authentication code is stored in a static portion of memory of the first AEPH chip. In an embodiment, the first authentication code is stored in a static memory portion of the first AEPH chip.

At block 204, the method 200 comprises reading a second authentication code by the reader-writer device from a second AEPH chip affixed to the container, wherein the second AEPH chip extracts electric power from the ambient radio frequency emission and the second authentication code is stored in a static portion of memory of the second AEPH chip. At block 206, the method 200 comprises sending the first authentication code and the second authentication code by the reader-writer device in an authentication service request message to an authentication service.

At block 208, the method 200 comprises receiving an authentication success message by the reader-writer device from the authentication service, wherein the authentication service accesses a data store to confirm an association of the first authentication code and the second authentication code for the product. At block 210, the method 200 comprises completing a product distribution action on the product based on receiving the authentication success message. In an embodiment, the product distribution action is receiving delivery of the product at a warehouse location. In an embodiment, the product distribution action is receiving delivery of the product at a retail store location. In an embodiment, the product distribution action is validating authenticity of the product at a point-of-sale terminal at a retail store location and presenting an indication of the success of the authentication on a display of the point-of-sale terminal.

In an embodiment, the method 200 further comprises reading a third authentication code by the reader writer device from a third AEPH chip affixed to at least one of a second container that stores a second product or a second closure associated with the second container, wherein the third AEPH chip extracts electric power from the ambient radio frequency emission and the third authentication code is stored in a static portion of memory of the third AEPH chip; reading a fourth authentication code by the reader-writer device from a fourth AEPH chip affixed to the container, wherein the fourth AEPH chip extracts electric power from the ambient radio frequency emission and the fourth authentication code is stored in a static portion of memory of the fourth AEPH chip; sending the third authentication code and the fourth authentication code by the reader-writer device in a second authentication service request message to the authentication service; receiving a second authentication failure message by the reader-writer device from the authentication service, wherein the authentication service accesses the data store to attempt to confirm an association of the third authentication code and the fourth authentication code for the product; and rejecting delivery of the second container.

In an embodiment, reading a fifth authentication code by the reader writer device from a fifth AEPH chip affixed to at least one of a third container that stores a third product or a third closure associated with the third container, wherein the fifth AEPH chip extracts electric power from the ambient radio frequency emission and the fifth authentication code is stored in a static portion of memory of the fifth AEPH chip; and determining by the reader writer device that the third product is inauthentic because the reader writer device is unable to communicate with a sixth AEPH chip affixed to the third container.

In an embodiment, the method 200 further comprises writing product distribution information by a second reader-writer device to the first identity chip. In an embodiment, the product distribution information is written to a memory portion of the first AEPH chip that supports a plurality of writes, for example to the dynamic memory portion 186.

Figure 3A:
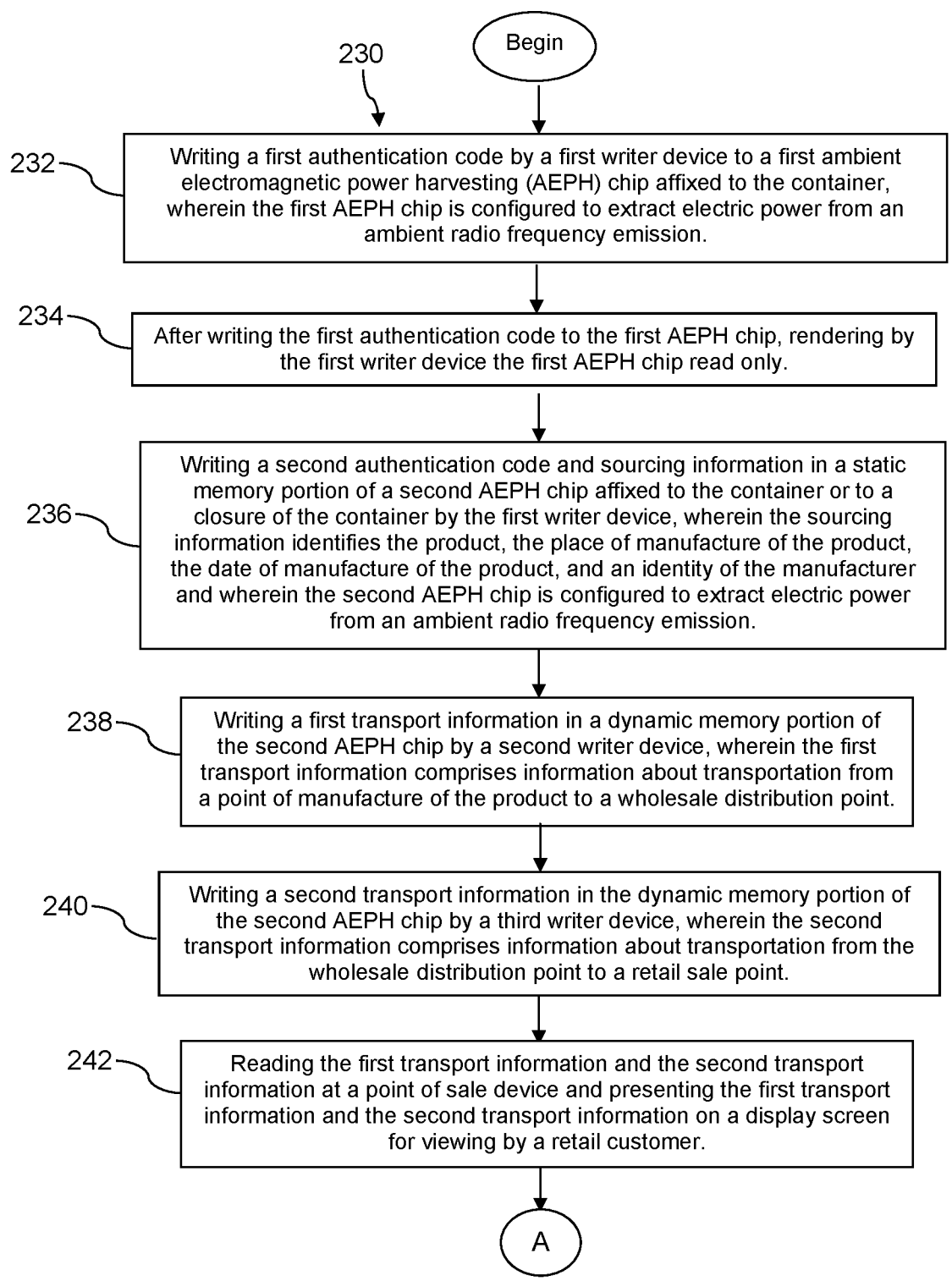
FIG. 3A and FIG. 3B are a flow chart of another method according to an embodiment of the disclosure.
Figure 3B:
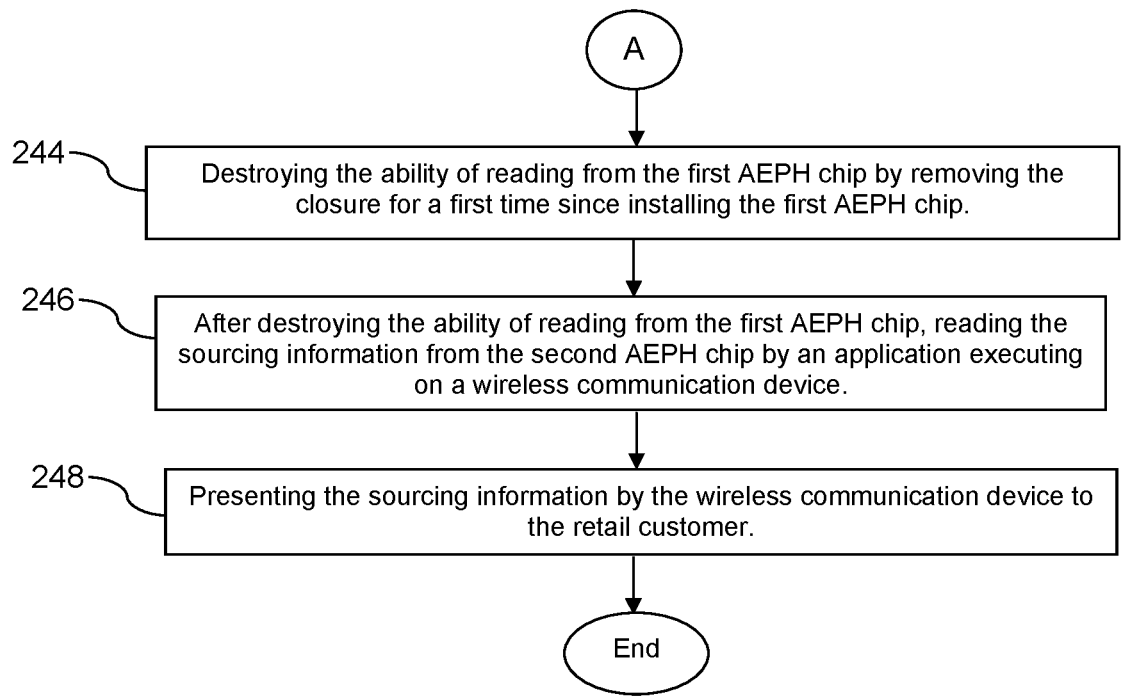

Turning now to FIG. 3, a method 230 is described. In an embodiment, the method 230 is a method of storing a product in a container having a closure and distributing the product while maintaining product sourcing information and product provenance information with the container and closure. In an embodiment, the product is a pharmaceutical product, a wine product, an alcoholic liquor, or a food product.

At block 232, the method 230 comprises writing a first authentication code by a first writer device to a first ambient electromagnetic power harvesting (AEPH) chip affixed to the container, wherein the first AEPH chip is configured to extract electric power from an ambient radio frequency emission. In an embodiment, the first AEPH chip is configured to extract electric power from an ambient radio frequency emission in the frequency range from 2.495 GHz to 2.5 GHz. In other embodiments, however, the first AEPH chip may harvest energy from ambient electromagnetic power in other frequency bands, for example in new frequency bands that are being assigned currently or in the future to cellular communication operations. At block 234, the method 230 comprises, after writing the first authentication code to the first AEPH chip, rendering by the first writer device the first AEPH chip read only.

At block 236, the method 230 comprises writing a second authentication code and sourcing information in a static memory portion of a second AEPH chip affixed to the container or to a closure of the container by the first writer device, wherein the sourcing information identifies the product, the place of manufacture of the product, the date of manufacture of the product, and an identity of the manufacturer and wherein the second AEPH chip is configured to extract electric power from an ambient radio frequency emission. In an embodiment, the second AEPH chip is configured to extract electric power from an ambient radio frequency emission in the frequency range from 2.495 GHz to 2.5 GHz. In other embodiments, however, the second AEPH chip may harvest energy from ambient electromagnetic power in other frequency bands, for example in new frequency bands that are being assigned currently or in the future to cellular communication operations. In an embodiment, the static memory portion of the second AEPH chip is configured to be written to only one time and after being written to once can no longer be written to. In an embodiment, the method 230 comprises sending the first authentication code and the second authentication code by the first writer device to a back-end data store, wherein the back-end data store creates a record associating the first authentication code and the second authentication code.

At block 238, the method 230 comprises writing a first transport information in a dynamic memory portion of the second AEPH chip by a second writer device, wherein the first transport information comprises information about transportation from a point of manufacture of the product to a wholesale distribution point. In an embodiment, the dynamic memory portion of the second AEPH chip is a non-transitory portion of memory and is configured to be written to multiple times and at different times. At block 240, the method 220 comprises writing a second transport information in the dynamic memory portion of the second AEPH chip by a third writer device, wherein the second transport information comprises information about transportation from the wholesale distribution point to a retail sale point. At block 242, the method 230 comprises reading the first transport information and the second transport information at a point of sale device and presenting the first transport information and the second transport information on a display screen for viewing by a retail customer. In an embodiment, the method 230 comprises reading the first authentication code by the by the point of sale device from the first AEPH chip; reading the second authentication code by the point of sale device from the second AEPH chip; sending the first authentication code and the second authentication code by the point of sale device to the back-end data store; receiving a confirmation by the point of sale device that the first authentication code and the second authentication code agree with each other; and presenting confirmation of agreement of the first authentication code with the second authentication code by the point of sale device on the display screen for viewing by the retail customer.

At block 244, the method 230 comprises destroying the ability of reading from the first AEPH chip by removing the closure for a first time since installing the first AEPH chip. At block 246, the method 230 comprises, after destroying the ability of reading from the first AEPH chip, reading the sourcing information from the second AEPH chip by an application executing on a wireless communication device. At block 248, the method 230 comprises presenting the sourcing information by the wireless communication device to the retail customer.

Figure 4:
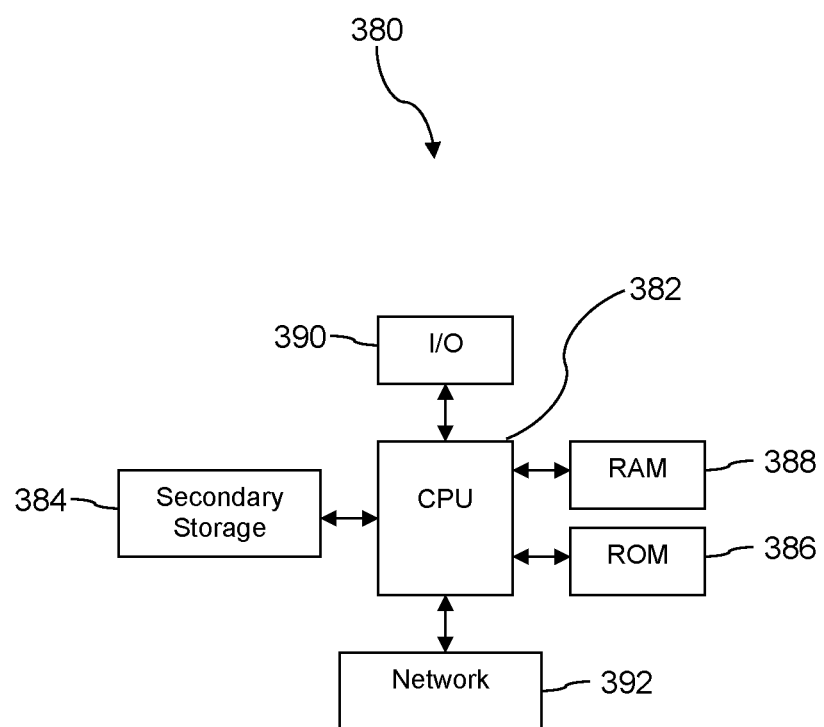
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of validating authenticity of a product stored in a container having a closure, comprising:
    reading a first authentication code by a reader writer device from a first ambient electromagnetic power harvesting (AEPH) chip affixed to at least one of the container or the closure, wherein the first AEPH chip extracts electric power from an ambient radio frequency emission and the first authentication code is stored in a static portion of memory of the first AEPH chip;
    reading a second authentication code by the reader-writer device from a second AEPH chip affixed to the container, wherein the second AEPH chip extracts electric power from the ambient radio frequency emission and the second authentication code is stored in a static portion of memory of the second AEPH chip;
    sending the first authentication code and the second authentication code by the reader-writer device in an authentication service request message to an authentication service;
    receiving an authentication success message by the reader-writer device from the authentication service, wherein the authentication service accessed a data store to confirm the association of the first authentication code and the second authentication code for the product;
    completing a product distribution action on the product based on receiving the authentication success message; and
    writing product distribution information by a second reader-writer device to the first AEPH chip, wherein the product distribution information is written to a memory portion of the first AEPH chip that supports a plurality of writes.

2. The method of claim 1, wherein the product distribution action is receiving delivery of the product at a warehouse location.

3. The method of claim 1, wherein the product distribution action is receiving delivery of the product at a retail store location.

4. The method of claim 1, wherein the product distribution action is validating authenticity of the product at a point-of-sale terminal at a retail store location and presenting an indication of the success of the authentication on a display of the point-of-sale terminal.

5. The method of claim 1, further comprising:
    reading a third authentication code by the reader writer device from a third AEPH chip affixed to at least one of a second container that stores a second product or a second closure associated with the second container, wherein the third AEPH chip extracts electric power from the ambient radio frequency emission and the third authentication code is stored in a static portion of memory of the third AEPH chip;
    reading a fourth authentication code by the reader-writer device from a fourth AEPH chip affixed to the container, wherein the fourth AEPH chip extracts electric power from the ambient radio frequency emission and the fourth authentication code is stored in a static portion of memory of the fourth AEPH chip;
    sending the third authentication code and the fourth authentication code by the reader-writer device in a second authentication service request message to the authentication service;
    receiving a authentication failure message by the reader-writer device from the authentication service, wherein the authentication service accesses the data store to attempt to confirm an association of the third authentication code and the fourth authentication code for the product; and rejecting delivery of the second container.

6. The method of claim 1, further comprising:

reading a fifth authentication code by the reader writer device from a fifth AEPH chip affixed to at least one of a third container that stores a third product or a third closure associated with the third container, wherein the fifth AEPH chip extracts electric power from the ambient radio frequency emission and the fifth authentication code is stored in a static portion of memory of the fifth AEPH chip; and determining by the reader writer device that the third product is inauthentic because the reader writer device is unable to communicate with a sixth AEPH chip affixed to the third container.

7. A method of storing a product in a container having a closure and distributing the product while maintaining product sourcing information and product provenance information with the container and closure, comprising:

writing a first authentication code by a first writer device to a first ambient electromagnetic power harvesting (AEPH) chip affixed to the container, wherein the first AEPH chip is configured to extract electric power from an ambient radio frequency emission;

after writing the first authentication code to the first AEPH chip, rendering by the first writer device the first AEPH chip read only;

writing a second authentication code and sourcing information in a static memory portion of a second AEPH chip affixed to the container or to a closure of the container by the first writer device, wherein the sourcing information identifies the product, the place of manufacture of the product, the date of manufacture of the product, and an identity of the manufacturer and wherein the second AEPH chip is configured to extract electric power from an ambient radio frequency emission;

writing a first transport information in a dynamic memory portion of the second AEPH chip by a second writer device, wherein the first transport information comprises information about transportation from a point of manufacture of the product to a wholesale distribution point;

writing a second transport information in the dynamic memory portion of the second AEPH chip by a third writer device, wherein the second transport information comprises information about transportation from the wholesale distribution point to a retail sale point;

reading the first transport information and the second transport information at a point of sale device and presenting the first transport information and the second transport information on a display screen for viewing by a retail customer;

destroying the ability of reading from the first AEPH chip by removing the closure for a first time since installing the first AEPH chip;

after destroying the ability of reading from the first AEPH chip, reading the sourcing information from the second AEPH chip by an application executing on a wireless communication device; and presenting the sourcing information by the wireless communication device to the retail customer.

8. The method of claim 7, wherein the first AEPH chip and the second AEPH chip are configured to extract electric power from an ambient radio frequency emission in the frequency range from 2.495 GHz to 2.5 GHz.

9. The method of claim 7, further comprising sending the first authentication code and the second authentication code by the first writer device to a back-end data store, wherein the back-end data store creates a record associating the first authentication code and the second authentication code;

reading the first authentication code by the by the point of sale device from the first AEPH chip;

reading the second authentication code by the point of sale device from the second AEPH chip;

sending the first authentication code and the second authentication code by the point of sale device to the back-end data store;

receiving a confirmation by the point of sale device that the first authentication code and the second authentication code agree with each other; and presenting confirmation of agreement of the first authentication code with the second authentication code by the point of sale device on the display screen for viewing by the retail customer.

10. The method of claim 7, wherein the static memory portion of the second AEPH chip is configured to be written to only one time and after being written to once can no longer be written to.

11. The method of claim 7, wherein the dynamic memory portion of the second AEPH chip is a non-transitory portion of memory and is configured to be written to multiple times and at different times.

12. The method of claim 7, wherein the product is a pharmaceutical product, a wine product, an alcoholic liquor, or a food product.

13. A product system, comprising:

a container;

a closure;

a product stored in the container and retained within the container by the closure;

a first ambient electromagnetic power harvesting (AEPH) chip affixed between the container and the closure in such a way that removing the closure destroys an antenna of the first AEPH chip, wherein the first AEPH chip stores a first authentication code; and a second AEPH chip affixed to one of the container or the closure, wherein the second AEPH chip stores a second authentication code, a reader authorization code, and sourcing information in a static memory portion, wherein the sourcing information identifies the product, the place of manufacture of the product, the date of manufacture of the product, and an identity of the manufacturer of the product, wherein the second AEPH chip is configured to receive a request for information from a reader comprising an authorization code, to compare the authorization code received in the request to the stored reader authorization code, and when the authorization code received in the request matches the stored reader authorization code, to transmit requested information at a frequency above 5 GHZ and less than 200 GHz.

14. The system of claim 13, wherein the first AEPH chip comprises an antenna, a first component of the antenna is affixed to the closure, and a second component of the antenna is affixed to the container.

15. The system of claim 13, wherein the first authentication code and the second authentication code are read by a separate reader, the authentication codes sent by the reader to a back-end authentication service, and results of the authentication returned by the back-end data authentication service to the reader, whereby substitution of a new AEPH to replace the first AEPH when broken during opening of the closure is detected and an attempt to substitute an ersatz product into the container after manufacturing is detected.

16. The system of claim 13, wherein the first authentication code and the second authentication code are associated with a specific instance of the container, closure, and product in a datastore independent from the system.

17. The system of claim 13, wherein the first AEPH chip and the second AEPH chip are configured to harvest electric power from ambient electromagnetic power in a frequency range of 2.495 GHz to 2.5 GHZ.

18. The system of claim 13, wherein the first AEPH chip and the second AEPH chip are configured to harvest electric power from an ambient electromagnetic field in a frequency range of 2.495 GHz to 2.5 GHZ.

* * * * *